May 7, 1940.　　　　F. R. BICHOWSKY　　　　2,199,967
AIR CONDITIONING
Original Filed May 26, 1934
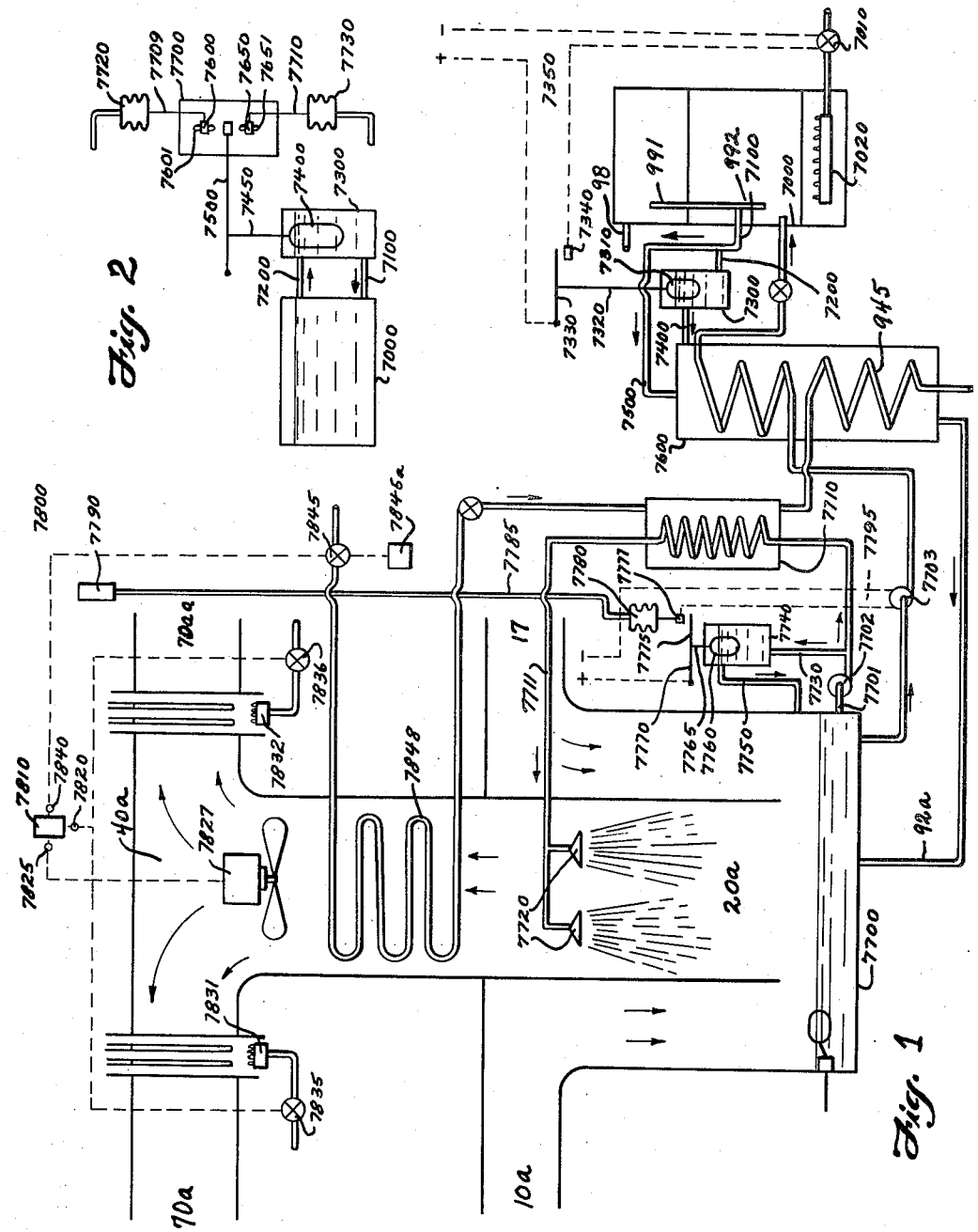
INVENTOR.
Francis R. Bichowsky
BY Spencer, Hardman & Herr
ATTORNEYS Patented May 7, 1940

2,199,967

UNITED STATES PATENT OFFICE 2,199,967

AIR CONDITIONING

Francis R. Bichowsky, Ann Arbor, Mich., assignor to General Motors Corporation, Dayton, Ohio, a corporation of Delaware Original application May 26, 1934, Serial No. 727,707. Divided and this application August 19, 1938, Serial No. 225,769

6 Claims. (Cl. 261—11)

This invention relates to refrigeration, as well as to the heating of air for the purposes of ventilation.

This application is a division of my copending application Serial No. 727,707 filed May 26, 1934.

One of the chief reasons restricting the use of equipment for conditioning air for human comfort has been the excessive cost of operation during the summer period. In practical operation, it costs from six to twenty times as much to lower the air one degree of effective temperature as to heat the air one degree of effective temperature. The reason for this has been that the only known way of lowering the effective temperature any useful amount has been by refrigeration. The cost of refrigeration per unit is much greater than the cost of heating. I have discovered a method of conditioning air in which, under favorable conditions, no artificial refrigeration means is required and in which cooling mediums, such as water, can be used in their natural temperatures, and which, under unfavorable conditions, requires much less refrigeration than any method known to the prior art, which method is applicable both to cooling the air in summer and heating it in winter.

In the prior art, the usual mode of lowering the effective temperature of the air as has been required in summer has been to cool the air by refrigeration. It has sometimes been proposed to use natural cold water to cool the air, but in practice, it is disadvantageous to use cold water. For if the air is cooled by natural cold water, whose temperature in the summer is usually well above 60° F. such cooling raises the relative humidity of the air to such a point that the air is uncomfortable. Thus air naturally at 80° F. and 50% relative humidity cooled with water to 60° would have its humidity raised to 97%. It is therefore the usual practice to cool a part of the air to a very low temperature by contacting it with some refrigerating means, thus removing the sensible heat of the air and by condensation removing a large portion of the contained moisture. Such air is under usual conditions saturated or nearly saturated with moisture at the low temperature though its relative humidity may be 100%, its absolute humidity is very low, and by mixing this cool and very dry air with untreated air, it is possible to obtain in the mixture the desired effective temperature. In practice, the method used is to spray a portion of the air which it is desired to condition with refrigerated water, the water being kept at as low a temperature as is practical, usually from 35 to 45° F.

in order to remove as large a fraction of moisture as is possible. With this method, only a certain portion of the moisture can be removed. In practical operation, the resultant treated air seldom has a relative humidity less than 60 to 70%. In order to obtain air which has a lower relative humidity, it has been proposed to replace the water by some non-congealing solution such as calcium chloride and sodium chloride solutions, with concentrations below 30 and 25% respectively, the limitations of concentration being fixed by the fact that above these concentrations these solutions precipitate solid or "freeze" at temperatures below 32 degrees F. By the use of such congealing solutions, it is possible to obtain air of almost any degree of dryness, though often such air will be so cold that it must be warmed for comfort and thus it is necessary to re-heat it before use. Other things being equal, the cost of refrigeration is roughly proportional to the number of degrees of cooling required times the amount of heat removed. Either of these means of conditioning air for comfort is therefore expensive.

I have discovered that it is possible to improve the efficiency and greatly lower the cost of air conditioning for comfort by operating according to the process of which the following is in specification: Instead of cooling the air and at the same time removing moisture, I first treat the air so as to remove moisture and then cool the air. By operating in this manner, I find it is possible to obtain several advantages.

In the first place, it requires much less cooling to cool dry air than to cool air containing moisture. This is because of the fact that in cooling moist air, it is necessary to remove not only the sensible heat of the air, but the latent heat of the vapor. Operating in accordance with my process, I therefore require less cooling to obtain the same final temperature than would be required to obtain this temperature by any of the means known to prior art.

Secondly, operating according to my process, it is not necessary to cool the air to as low a temperature in order to obtain the same degree of comfort. It is a known fact that the apparent or effective temperature of air can be lowered by lowering the humidity or by lowering the temperature. For example, air at a relative humidity of 35% which may be easily obtained by my process has the same apparent or effective temperature at 80° as air with 70% relative humidity has at 75°.

As a means of pre-drying air without use of refrigeration, it is necessary to contact the air with a liquid drying agent with great drying power. Experiments have shown that both the degree of comfort and amount of cooling necessary for equal effective temperatures depend on the relative humidity of the air. Thus if the air is dried to 5% relative humidity at 90° F. and cooled to 81° F. which is the required degree of cooling for outside temperatures of 95° F. the amount of cooling required is .18 B. t. u. per cubic ft. The resultant relative humidity is 20%. Similarly for air at 90° F. and at respectively 25, 35, 45, 55% relative humidity, the amount of cooling to reach comfort is 0.24, 0.28, 0.34, 0.38 B. t. u. per cubic ft. of air, the resultant humidity is respectively 38, 55, 77, 100% relative humidity. As is well known at any temperature, relative humidities above 55% give a sticky uncomfortable feeling while humidities below 25% feel very dry. The ideal range of humidities before cooling for air dried at temperatures of 90° F. is from 17 to 25%. At other temperatures near room temperature the desirable range is about the same. In order that such drying agents may be readily moved from place to place, and in order that they may be easily placed in contact with the air, it is necessary that they be liquid at the concentrations used and over the temperatures met in practice. In order that the moisture which is absorbed by said drying agent may be removed, so that the drying agents may be used over again, it is necessary that they are stable towards heat and not corrosive. I have found that liquid drying agents known to the prior art, such as solutions of calcium chloride, sodium chloride, sulphuric acid and glycerine are undesirable since these solutions either do not have the necessary drying power at room temperature or are corrosive or unstable. I have discovered that there are certain solutions that meet the requirements of my process, namely phosphoric acid; certain acid-anhydrides; certain poly-alcohols, such as ethylene glycol; certain ammonium salts; such as ammonium rhodanate; certain lithium salts, such as lithium chloride or lithium bromide, lithium iodide and lithium rhodanate; and certain calcium salts such as calcium rhodanate. In practice, I prefer to use solutions of lithium chloride, and bromide as disclosed in my copending application Serial No. 457,142. In order to economize, I prefer to use such liquid drying agents at room temperature or slightly above or below and to contact them with air in such a way that the air leaving the liquid drying agents is at as near the same temperature as the entering drying agent as is possible and is at as low relative humidity as the drying agent will allow; that is to say, I prefer to contact the air and liquid drying agent at as near equilibrium conditions both in respect to temperature and humidity as is possible. In order to keep operating costs as low as possible, I prefer to use the liquid drying agent over-and-over again removing that portion of the moisture which is absorbed by the drying agent or adding that portion of the moisture which was lost by the drying agent, conveniently by evaporating a portion of the drying agent or by adding water to a portion of the drying agent as is desired.

It is one of the advantages of this process of air conditioning that it can be applied in a great number of different ways. For example, it may be used only to condition air in the summer, in accordance with the general process as hereinbefore described, or it may be used to condition air in winter as will be more fully described hereafter, or it may be used for both of these purposes. In the process of conditioning air in the winter, it is, in general, necessary to heat the air and to humidify it. In my general process of air conditioning, as herein described, air is first placed in contact with a liquid agent at essentially equilibrium conditions. It is an advantage of this system, that, by employing liquid agents of the class described, they have a reversible moisture exchange with the air being conditioned, since they will serve either to dry the air, if the entering air has a relative humidity higher than corresponds to the partial pressure of the water over the solution, or to moisten the air, if it has a humidity less than that which corresponds to the partial pressure of the water over the solution. Therefore, by first contacting the air with solution of proper strength, it is possible to obtain air at a desired humidity either by removing humidity from the air or by adding humidity as the case may require. In accordance with my process as applied to winter conditions, the air of controlled humidity produced by the first step in the process is heated to the desired temperature as the second step in the process. It has been found practical to use exactly the same apparatus for heating the air in the winter as may be used for cooling the air in the summer by substituting hot water, steam or other source of heat in the winter for cold water or other source of cold in the summer.

In the drawing:

Fig. 1 is a diagrammatic representation of an apparatus for practicing my invention; and Fig. 2 is a diagrammatic representation of a modified form of control which may be used with the apparatus shown in Fig. 1.

An advantage of my process of air conditioning is that it can be applied to existing air conditioning equipment, as well as to novel equipment and novel combination of old equipment.

In the drawing there have been omitted the means for conveying the air, from an enclosure or room to and from the device in which it is conditioned. These means will usually consist of ducts and fans, together with such means of regulating the flow of air and of introducing outside air as is usual with the art. The direction of the flow of air is indicated by parallel arrows and direction of the flow of liquid indicated by single arrows placed along the pipes.

It is to be understood that any of the well known means for automatically or semi-automatically controlling the operation of the various functions may be provided. In particular, the controls may be provided to regulate the density or concentration of the concentrated fluid produced in the regenerator. Means may be provided for regulating the temperature of the fluid as returned to the sump. Means may be provided for regulating the density or concentration of the fluid in the sump. Means may be provided for regulating the temperature of the fluid in the sump. Means may be provided for controlling the air flow through the contacting device. Means may be provided for adjusting the portion of external air added to the compartment and to the contacting device. Means may be provided for controlling the temperature of the cooling and heating means. Means may be provided for adjusting various valves regulating the operation of the system.

It may be desirable to maintain the drying power of the fluid at the sump either at a predetermined constant value or at a value such that the humidity of the space to be conditioned is maintained constant or at a predetermined value. To accomplish this there may be placed in the sump, or connected to it, a densitometer, either of the type shown in Fig. 1 or of the type shown in Fig. 2, the construction and operation of which will be explained more fully hereinafter.

In Fig. 1 is shown a preferred arrangement of the system with operating controls provided as above. In this figure 10a is a duct or opening adapted to receive air from the compartment or compartments which are to be conditioned. This air is first passed into the chamber 20a. There is also provided in this mode of operating my process a second duct 17 through which can be drawn fresh air. The air from the duct 17 enters the chamber 20a where it may be mixed with the air from the duct 10a. In the chamber 20a the air from the combined sources is sprayed with a concentrated liquid solution of my novel drying agent produced by means of the nozzles 7720. Preferably, the direction of spray and the direction of air flow should be opposite. The spray after contacting with the air may be collected in the sump 7700. The air in the chamber 20a, after having passed through the spray, is heated or cooled by the interchanger 7848. Conveniently, the heating or cooling fluid passing through the pipes of said heat interchanger may be made to flow in a general opposite direction to the direction of air flow. It will be usually convenient to provide a motor-driven fan 7827 in the air duct. It is generally advantageous to place the fan at the point shown since by this arrangement the sections of the apparatus 20a, etc., which are filled with spray, are under suction instead of under pressure. After leaving the fan 7827, it is convenient to take off the duct 40a separate ducts 70a and 70aa leading to separate rooms. It is sometimes found convenient to use, during the winter, in connection with or in place of the heating produced at 7848 other sources of heat such as small hot air gas furnaces 7831 and 7832.

Returning now to the source of the drying solution, it will be noted that the solution in passing through the spray, if the air has a relative humidity greater than that of the spray, will pick up moisture, and thus dilute the brine supply in the sump 7700. To maintain this supply at a predetermined concentration, a certain portion is continually or intermittently drawn off by the pump 7703. From hence it is forced through the interchanger 7600 and hence into the boiler 7000. Heat is supplied to this boiler through the heat source 7020 which may be a gas burner, oil burner or any source of heat in the boiler whereby a portion of the contained water is boiled off as steam through the pipe 98. The hot concentrated drying agent is drawn off through the pipe 7100 which may be provided with a vent 991 and suction branch 992, through the interchanger 7600 where it serves to heat the portion of drying solution flowing through said interchanger and at the same time is cooled thereby. Continuing into the lower portion of the interchanger it is further cooled by liquid in the coil 945 and flows from hence via the pipe 92a into the sump 7700, thus maintaining the liquid in said sump at the desired concentration. From the sump 7700 the liquid is drawn off through the pipe 7701 by means of the pump 7702. It may be further cooled or heated in the interchanger 7710. From this interchanger it is forced through the pipe 7711 into the sprays 7720. Water is admitted to the interchanger 7848 through the valve 7845 from a natural source, or spray tower, or other source of water in or near the natural temperature range 65 to 80° F. The water, after leaving the coil 7848 flows into the interchanger 7710 serving to precool the sprayed drying solution. From hence it may flow through the cooling coil 945 and then to waste.

The drying liquid which has been concentrated in the regenerator or rectifier 7000 returns via the pipe 7100 and a certain portion passes into the branch 7200 which conveys drying liquid to the base of the densitometer chamber 7300. From hence the liquid overflows at a constant level out the pipe 7400 and is joined by the main stream of liquid through the pipe 7500 in the intercooler 7600. From whence it returns via the unnumbered channels to the sump 7700. There is provided in the chamber 7300 a float 7310 provided with a stem 7320 which is constrained to move with the body of the float as the liquid density changes. The vertical motion of the float actuates a lever 7330 which makes electrical contact with a contact 7340 thus opening the contact when the density of the fluid in chamber 7300 becomes greater than a predetermined value. An electric circuit 7350 is provided so that on breaking the contact 7340, the valve 7010 will be closed or restricted, thus decreasing the flow of fuel to the valve 7010 through the burner 7020 and thus controlling the flow of heat to the regenerator 7100, thereby retaining the concentration of the fluid leaving the regenerator 7100 at a constant predetermined value. In the circuit which circulates fluid from the sump 7700 to the spray nozzles 7720, which circuit consists of a pipe 7701, a pump 7702, the interchanger 7710, and the pipe 7711 there is provided a branch 7730 leading a portion of the fluid circulating to the base of the densitometer 7740 and from hence by the overflow 7750 back to the sump 7700.

There is provided a float 7760 with a stem 7765 so arranged that the body of the float is under the liquid level. The float actuates a lever 7770 which makes contact at 7775 with a contact 7777, the position of said contact being variable in accordance with the motion of a bellows 7780, said bellows being actuated through the pipe 7785 by the expansion of liquid in a wet thermometric bulb 7790 or actuated by any other device responsive to the relative humidity. The humid bulb thermometer 7790 may be placed in the space to be air conditioned as is desired.

There is provided an electrical circuit 7795 which will be made or broken by the contact of the lever 7770 with the contact 7777 and will thus turn on and off or partially turn on or off, the pump 7703 thus regulating the amount of liquid flowing through the circuit which includes the pump 7703 and the regenerator or rectifier 7000. The amount of liquid flowing through this circuit will therefore be responsive to changes in density of the liquid flowing through the circuit and will be maintained so as to give a density such that the humidity or wet bulb temperature in the space 7800 is maintained at a desired figure. There is provided also in the space 7800 a thermostat 7810 responsive to the temperature of said space and controlling by means of the electric switch 7820 the gas burner valves 7835 and 7836 and by means of the switch 7825 the operation of the fan 7827 and by means of the switch 7840, the operation of the valve 7845. The valve 7845 may, if desired, be controlled by an outside thermostat 7845a instead. Circulation of air is controlled by the fan 7827. The amount of heat being supplied is controlled by the gas burners 7832 and 7831, which gas burners will generally be arranged so that they will not be on except when the temperature falls below a predetermined value. The flow of cooling fluid through the cooling coil 7848 is controlled by means of the valve 7845.

Inasmuch as it may be desirable to maintain the drying power of the fluid at the sump either at a predetermined constant value or at a value such that the humidity of the space to be conditioned is maintained constant or at a predetermined value, there may be placed in the sump or connected to it a densitometer of the type shown in Fig. 2. In Fig. 2, 7000 is a sump such as has been shown in Fig. 1 connected to which by the pipes 7100, 7200, is a chamber 7300 containing a submerged float 7400 with a stem 7450 operating a movable lever 7500, said lever making contact with one or two contacts 7600, 7650. The condition of these contacts may be made variable so that the concentration which is to be maintained in the sump may be controlled either manually or automatically. For example, the contacts may slide in slots 7601, 7651, on an insulated base 7700. The position of the contacts in these slots may be automatically adjusted in accordance with the humidity of the space to be controlled or in accordance with some combination of the temperature and humidity of the space to be controlled by means of the linkages 7709, 7710, operated by the bellows 7720, 7730, the motion of which is controlled by the temperature or humidity of the space to be conditioned or by some other means.

It may be also desired to control the temperature of the liquid in the sump either to maintain it constant or to maintain it at a predetermined value in accordance with the temperature of the space to be controlled. For this reason a thermostat may be provided, the operation of which will regulate the amount or temperature of the cooling water or other cooling means used to cool the liquid in the sump or flowing to the various contacting units. The amount of air through the various contacting units may be controlled by means varying the speed of the blower or by opening or closing various baffles, not shown, but which are well known to the art.

Various interconnections and safety devices may be provided, as is known in the art. These devices are not shown in the figure.

While the form of embodiment of the invention as herein disclosed, constitutes a preferred form, it is to be understood that other forms might be adopted, all coming within the scope of the claims which follow.

What is claimed is as follows:

1. In an air conditioning system, an air contacting chamber, means for circulating air through said contacting chamber, means for circulating a hygroscopic liquid in contact with air in said air contacting chamber, a sump for said liquid, a concentrator for said liquid, liquid flow connections between said sump and said concentrator, means for circulating a cooling fluid in thermal exchange with air in said air contacting chamber, means for thereafter circulating said cooling fluid in thermal exchange with hygroscopic liquid about to contact air in said contact chamber, and means for thereafter circulating said cooling fluid in thermal exchange with hygroscopic liquid flowing from said concentrator to said sump.

2. In combination, means for drying and cooling air for an enclosure comprising an air contacting chamber, means for circulating a cooling fluid in thermal exchange with air in said chamber, means for circulating hygroscopic liquid in contact with air in said contacting chamber, a sump for said hygroscopic liquid, a concentrator for said hygroscopic liquid, flow connections between said sump and said concentrator, means whereby concentrated liquid flowing from said concentrator to said sump flows in thermal exchange relationship with liquid flowing from said sump to said concentrator, and thereafter flows in thermal exchange relationship with cooling fluid discharged from said chamber.

3. Control means for a hygroscopic liquid concentrator comprising a first contact member, means responsive to the density of a body of hygroscopic liquid for actuating said first contact member, a second contact member cooperating with said first contact member, and means responsive to one function of the psychrometric condition of air for actuating said second named contact relative to said first named contact member.

4. In an air conditioning system, an air contacting chamber, means for circulating air through said contacting chamber, means for circulating a hygroscopic liquid in contact with air in said air contacting chamber, a sump for said liquid, a concentrator for said liquid, liquid flow connections between said sump and said concentrator, means responsive to the degree of concentration of hygroscopic liquid in said sump for controlling the flow of hygroscopic liquid between said sump and said concentrator, and means responsive to the degree of concentration of liquid in said concentrator for controlling the concentration of said liquid in said concentrator.

5. In combination with apparatus for regenerating a hygroscopic medium for use in drying a gas, a device for measuring one function of the moisture absorbing ability of said medium, apparatus operated by said device for controlling the regeneration of said medium, and humidity responsive means for adjusting the setting of said device.

6. In combination with apparatus for regenerating a hygroscopic medium for use in drying a gas, a device for measuring one function of the moisture absorbing ability of said medium, apparatus operated by said device for controlling the regeneration of said medium, and temperature responsive means for adjusting the setting of said device.

FRANCIS R. BICHOWSKY.